US010550752B2

United States Patent
Türk et al.

(10) Patent No.: US 10,550,752 B2
(45) Date of Patent: Feb. 4, 2020

(54) PIPE CONNECTION ARRANGEMENT FOR CONNECTING TWO PIPE ENDS, IN PARTICULAR TWO PIPE ENDS ARRANGED IN AN EXHAUST LINE OF A COMBUSTION ENGINE

(71) Applicant: MAN Truck & Bus AG, München (DE)

(72) Inventors: Jens Türk, Postbauer-Heng (DE); Michael Schobig, Stein (DE)

(73) Assignee: MAN TRUCK & BUS SE, Munich (DE)

(*) Notice: Subject to any disclaimer, the term of this patent is extended or adjusted under 35 U.S.C. 154(b) by 485 days.

(21) Appl. No.: 15/144,444

(22) Filed: May 2, 2016

(65) Prior Publication Data

US 2016/0333765 A1 Nov. 17, 2016

(30) Foreign Application Priority Data

May 13, 2015 (DE) .................. 10 2015 006 024

(51) Int. Cl.
| | | |
|---|---|---|
| F01N 13/18 | (2010.01) | |
| F16L 27/04 | (2006.01) | |
| F16L 27/12 | (2006.01) | |

(52) U.S. Cl.
CPC ...... *F01N 13/1844* (2013.01); *F01N 13/1811* (2013.01); *F16L 27/04* (2013.01); *F16L 27/125* (2013.01); *F01N 2510/02* (2013.01); *F01N 2510/06* (2013.01)

(58) Field of Classification Search
CPC ......... F16L 27/06; F16L 27/04; F16L 27/125; F16L 47/18; F10N 13/1844; F10N 13/1811; F01N 2510/06; F01N 2510/02

USPC .......... 285/261, 263, 270, 271, 146.1, 146.2
See application file for complete search history.

(56) References Cited

U.S. PATENT DOCUMENTS

| | | | | |
|---|---|---|---|---|
| 2,516,743 | A | | 7/1950 | Allin |
| 2,845,283 | A | * | 7/1958 | Kuhn .................... F16L 27/026 |
| | | | | 285/146.2 |
| 2,890,067 | A | * | 6/1959 | Morin .................... F16L 27/04 |
| 3,340,874 | A | | 9/1967 | Burgeni |

(Continued)

FOREIGN PATENT DOCUMENTS

| | | |
|---|---|---|
| CN | 202073625 U | 12/2011 |
| CN | 104005880 A | 8/2014 |

(Continued)

OTHER PUBLICATIONS

CNIPA, English translation of a Search Report for the corresponding Chinese patent application No. 201610314558.6, dated Jun. 24, 2016 (2 pages).

*Primary Examiner* — Zachary T Dragicevich
(74) *Attorney, Agent, or Firm* — Lucas & Mercanti, LLP (57) ABSTRACT

A pipe connection arrangement for connecting two pipe ends arranged in an exhaust line of a combustion engine, the two pipe ends being aligned axially with respect to one another and/or are spaced apart and, on the outer circumferential surface thereof, each have a raised spherical segment in a ring shape. The spherical segments are accommodated in a connecting pipe which surrounds the pipe ends in an overlapping section such that the circumference of the raised spherical segments rests radially on an inner wall of the connecting pipe in a spherical-segment contact region.

24 Claims, 6 Drawing Sheets

(56) References Cited

U.S. PATENT DOCUMENTS

| | | | |
|---|---|---|---|
| 4,408,785 A * | 10/1983 | Legros | F16L 27/04 |
| | | | 285/146.1 X |
| 5,149,147 A * | 9/1992 | Kastrup | 285/261 |
| 5,167,430 A | 12/1992 | Bainbridge | |
| 6,604,759 B2 | 8/2003 | Binoeder | |
| 2002/0130514 A1 | 9/2002 | Binoder | |

FOREIGN PATENT DOCUMENTS

| | | |
|---|---|---|
| DE | 1491170 A1 | 7/1969 |
| DE | 102010045986 A1 | 5/2011 |
| EP | 1191269 A2 | 3/2002 |
| EP | 2096194 A2 | 9/2009 |
| EP | 2154408 A1 | 2/2010 |
| EP | 2273175 A1 | 1/2011 |

* cited by examiner

PIPE CONNECTION ARRANGEMENT FOR CONNECTING TWO PIPE ENDS, IN PARTICULAR TWO PIPE ENDS ARRANGED IN AN EXHAUST LINE OF A COMBUSTION ENGINE

CROSS-REFERENCE TO RELATED APPLICATIONS

This application claims the priority of DE 10 2015 006 024.4, filed on May 13, 2015, which is incorporated herein in its entirety by reference.

BACKGROUND OF THE INVENTION

The invention relates to a pipe connection arrangement for connecting two pipe ends, in particular two pipe ends arranged in an exhaust line of a combustion engine. The invention furthermore relates to an exhaust line of a combustion engine of a vehicle, in particular a commercial vehicle, having a pipe connection arrangement, and to a commercial vehicle having an exhaust line of this kind.

In a pipe connection arrangement in an exhaust flow of a combustion engine, there is a need particularly to take into account the thermal pipe expansion during operation, owing to which the end faces of the two pipe ends move towards one another. In addition to such axial movement, angular misalignment and axial offsets can also occur in the connection arrangement. In order to compensate for such position tolerances, there is a widely known practice of arranging the mutually associated pipe ends in axial alignment and spaced apart and to connect them with a connecting pipe arrangement which can be deformed and/or displaced during relative movements of the pipe ends. Widely known examples of such compensating connecting pipe arrangements are corrugated-tube compensators or elastomer compensators connected to each of the two pipe ends, especially silicone rubber compensators, or, alternatively, plug-type connections. Such connecting pipe arrangements, which connect in a leaktight manner, are generally less resistant to the high thermal stresses of the kind that occur in an exhaust line of a combustion engine than the pipes used, and therefore weak points can form, with the possibility of leaks.

EP 2 273 175 B1 discloses an arrangement for connecting two pipe ends, wherein the two pipe ends are spaced apart by an axial gap and are connected in a plug-type connection by a connecting pipe section, such that the connecting pipe section is inserted into both pipe end regions, making leaktight contact with the inside of the pipe ends by an axial end segment. A leaktight joint which is capable of thermal expansion and compensates position tolerances is thus created here for connecting pipe ends in an engine exhaust system. Here, the connecting pipe section is to be composed of an alloy that can be precipitation-hardened. Moreover, the outer surfaces of the connecting pipe section are to have a wear-resistant coating. A wear-resistant galvanized coating of this kind is furthermore known from EP 2 096 194 A2.

A similar structure with a wear-resistant coating on the outer surface of the connecting pipe is furthermore known from EP 2 154 408 B1.

DE 10 2010 045 986 A1 likewise discloses internal connecting pipe embodiments of this kind but also simultaneously discloses external connecting pipes, where the pipe ends rest against the inner walls of the connecting pipe in a broad, extensive contact joint. Here, the pipe ends can each have a raised spherical segment running round in a ring shape on the outer circumferential surface thereof, wherein the associated inner wall regions of the external connecting pipe have a correspondingly spherical configuration to create an extensive contact joint.

An external connecting pipe is also known from DE 1 49 11 70 A, which shows a flexible pipe connection and in which the cylindrical pipe ends are provided with what are termed spherical raised surfaces, which rest over an extended area on a correspondingly spherically configured inner surface of the connecting pipe.

The disadvantages with all these known pipe connection arrangements is that they are, in some cases, very expensive to produce and assemble and furthermore that position tolerances cannot be compensated to the desired extent.

BRIEF SUMMARY OF THE PRESENT INVENTION

An object of the present invention is to provide a pipe connection arrangement for connecting pipe ends of two pipes, in particular two pipe ends arranged in an exhaust line of a combustion engine, which is relatively simple both in terms of manufacture and in terms of assembly and is furthermore capable of compensating position tolerances to a great extent in a functionally reliable manner.

According to a first embodiment, a pipe connection arrangement for connecting pipe ends of two pipes, in particular of two pipes arranged in an exhaust line of a combustion engine, includes two pipe ends, which are aligned axially with respect to one another and/or are spaced apart and, on the outer circumferential surface thereof, each have a raised spherical segment running around in a ring shape. The two pipe ends are accommodated by their raised spherical segments in a connecting pipe which surrounds the pipe ends on the outside in an overlapping section such that the circumference of the spherical segments rests radially on an inner wall of the connecting pipe in a spherical-segment contact region. According to the invention, it is envisaged that the raised spherical segments each rest on the inner wall of the connecting pipe along a circular line and hence in circular-line contact in the spherical-segment contact regions, in particular in a leaktight manner. This is the case when the diameter of the spherical segments is made equal to the inside diameter of the connecting pipe in the associated spherical-segment contact region.

The contact between the raised spherical segments at the ends of the pipes and the inner wall of the connecting pipe, which contact is only along a circular line, allows the formation of a sufficiently leaktight joint between the connecting pipe and the pipe end and furthermore allows compensation of position tolerances, such as angular misalignments, axial offsets and/or longitudinal offsets, to a particularly large extent since the circular-line contact is a particularly effective way of enabling the pipe ends to be deflected with a relatively large tilt angle while retaining the leaktight contact joint at the inner wall of the connecting pipe. Moreover, unlike an extensive contact joint, such circular-line contact is less prone to leak-inducing overdetermination due, for example, to tolerance-related inaccuracies in production and/or thermally induced inaccuracies during operation. In addition, the pipe connection according to the invention, with the connecting pipe on the outside and the spherical segments of the pipe ends there being inserted only in circular-line contact, can also be produced in a way which is quick and simple in terms of assembly.

In principle, the connecting pipe itself can take any desired form, being designed as a corrugated tube for example, provided only that, for circular-line contact of the raised spherical segments on the inner wall of the connecting pipe, the inner wall of the connecting pipe is of smooth and circular-cylindrical design, at least in the spherical-segment contact region, with an inner-wall inside diameter corresponding substantially to the spherical-segment contact region that is in linear contact. It is self-evident that the spherical-segment outside diameter defined by the circular-line contact on the inner wall of the connecting pipe corresponds here to the associated inner-wall inside diameter in such a way that there is a sufficiently leaktight contact joint between the raised spherical segments and the inner wall, that is to say that it should also expressly include a certain oversize in order to make available a sufficiently functionally reliable and gas-tight press-fit joint.

By way of example, this oversize required for a press fit could be provided by an appropriate coating and/or design of the mutually associated contact surfaces using a wear-resistant material. That is to say that the inner wall of the connecting pipe can be produced from or be coated with a wear-resistant material, at least in the spherical-segment contact region and/or the outer surface of the spherical segment.

According to another embodiment, the inner wall of the connecting pipe is of smooth and circular-cylindrical design throughout, with a constant inside diameter throughout. Such an inner-wall geometry can be produced easily and cheaply.

To facilitate insertion of the spherical segments at the pipe ends, it is furthermore possible here for a chamfer, in particular a rounded chamfer, to be provided on each of the two opposite ends of the connecting pipe.

A connecting pipe which is formed by a cylindrical pipe forming a connecting sleeve with a constant inside and outside diameter throughout is particularly easy and cheap to produce.

According to another embodiment, a catalytic substrate can be introduced into the interior of the connecting pipe, at least in some region or regions, and/or a catalytic coating can be provided, at least in some region or regions, in the interior of the connecting pipe, e.g., on an inner wall of the connecting pipe, in order to effect exhaust gas purification and/or to contribute to exhaust gas purification. As a particularly preferred option, here, the catalytic substrate and/or the catalytic coating is/are provided at least in a segment situated between the two spherical-segment contact regions. Here, therefore, the connecting pipe or the interior (e.g. the inner wall) of the connecting pipe then performs a particularly preferred dual function, simultaneously contributing to exhaust gas purification, thereby enabling the efficiency of exhaust gas purification to be increased or boosted overall.

Moreover, the connecting pipe can also be provided with a thermally insulating coating on the outside thereof, at least in some region or regions. This contributes to the avoidance of impermissible heat losses and hence surface temperatures, and therefore there is then no possibility of unwanted condensation in the region of the connecting pipe. In principle, the coating can be of any desired design, being formed by an insulating material for example, but it can also be formed, for example, by a separate component, which is used to jacket the connecting pipe. As an alternative, however, the thermally insulating coating can also be formed by a firmly adhering coating, e.g., by a thermally stable elastomer coating, e.g., a silicone coating.

As regards the compensation of position tolerances, in particular the compensation of angular misalignments, axial offsets and/or length offsets, it has proven particularly advantageous if, when seen in longitudinal section, at least one of the two raised spherical segments, preferably both raised spherical segments, of the pipe connection arrangement according to the invention forms a circular segment adjoining the smooth outside of the pipe end, wherein at least one of the following conditions applies to the circular segment:

a) the centre angle measured from the centre of the circle of the circular segment is 90° to 120°, preferably 100° to 110°,     b) the ratio of the segment height to the segment length defined by the chord of the circle is 1:3 to 1:5, preferably 1:3.5 to 1:4.2,     c) the ratio of the segment height to the radius is 1:2 to 1:3, preferably 1:2.4 to 1:2.7,     d) the ratio of the radius to the circular segment length defined by the chord of the circle is 1:1.25 to 1:1.75, preferably 1:1.4 to 1:1.6, most preferably approximately 1:1.15.

The ratios given above are to be interpreted in such a way that the value mentioned second is in each case a multiple of the value mentioned first, that is to say, in the case of the ratio b) of the segment height to the chord of the circle, for example, a ratio of 1:3 means, in concrete terms, that the chord of the circle is three times the segment height. The same applies analogously to the ratios given in points c) and d) and to any ratios that may be mentioned below.

As already explained, research undertaken by the inventor has shown that at least one of the conditions mentioned must be satisfied in order to make available a structure that allows position tolerances and high thermal loads to be compensated in a functionally reliable manner within wide ranges while nevertheless achieving particularly good results as regards the compensation of position tolerances within a wide range if all conditions a) to d) mentioned are jointly satisfied.

The individual conditions mentioned have the effect that the raised spherical segments can come to rest in the desired circular-line contact on the inner wall of the connecting pipe in a functionally reliable and leaktight manner, even in the case of large axial offsets or angular misalignments. Moreover, this effect can be further enhanced if, according to another particularly preferred embodiment, the distance of the point of contact, based on the longitudinal section through the pipe connection arrangement, of the raised spherical segment from the insertion edge, associated with the spherical segment, of the inner wall of the connecting pipe in a starting position of the pipe connection is at most 2.5 times the segment height, preferably at most 2.0 times the segment height, and at least 1.0 times the segment height, preferably at least 1.5 times the segment height. With such an embodiment, it is possible to obtain not only relatively large angular misalignments and axial offsets but also axial displacement of the pipe ends within the external connecting pipe in a functionally reliable manner.

It has furthermore proven advantageous overall as regards the pipe dimensioning if the ratio of the radius of the circular segment to the outside diameter of the pipe end in the region outside the raised spherical segment is 1:1.1 to 1:1.4, preferably 1:1.2 to 1:1.3. By this means too, it is ensured that the pipe end provided with the raised spherical segment can be displaced within relatively large angular ranges relative to the connecting pipe.

It is particularly advantageous in terms of manufacture if the two raised spherical segments at the pipe ends are of identical design with geometrically the same dimensions, thus enabling the connecting pipe to be produced in a particularly simple and inexpensive way, for example, since it can receive both one and the other pipe end from both sides. This reduces the number of different parts and helps to reduce production costs and storage costs.

At least one of the raised spherical segments, preferably both raised spherical segments, of the pipe connection arrangement is/are of materially uniform and/or integral design with the associated pipe end, being produced by appropriate machining, for example, by turning or milling, or by forming. However, as an alternative, it is also possible for at least one of the raised spherical segments, preferably both raised spherical segments, to be formed by a separate component which is connected positively and/or non-positively and/or positively to its associated pipe end. The latter variant embodiment has the advantage that the pipe ends can be produced essentially as identical parts and can be provided individually with the correspondingly desired spherical segments.

According to an embodiment, the pipe end has an internal thread, into which the raised spherical segment can be screwed by a spigot portion, which adjoins the spherical segment and has a corresponding external thread. As an alternative, the pipe end can have an external thread, onto which the raised spherical segment can be screwed by a spigot portion, which adjoins the spherical segment and has a corresponding internal thread. In conjunction with a screw-fastening solution of this kind, a structure in which the spherical segment has at least one tool application feature is advantageous. This tool application feature can be formed by a plurality of external slot-type engagement recesses as a tool application feature, for example.

However, as an alternative to the screw-fastening solution just described, the spherical segment can have an internal recess and be pressed onto the pipe end as an externally compressed component. As an alternative, however, the spherical segment can also have a spigot portion, that allows the spherical segment to be pressed into the pipe end as an internally compressed component. It is self-evident that, in the case of all the abovementioned embodiments with a spigot portion, the spherical segment then projects away freely from the pipe end in a corresponding manner so that it can be inserted or pushed into the connecting pipe.

For a particularly strong connection of the pipe end to the spherical segment, provision can be made to connect them materially, at least in some region or regions. Welding and/or brazing are particularly suitable for material joints.

The advantages obtained with the exhaust line according to the invention and with the commercial vehicle according to the invention correspond exactly to those already explained above in great detail in connection with the pipe connection arrangement according to the invention.

Here, the pipe ends to be connected are preferably formed by adjacent exhaust manifold sections but, in general, they can also be formed by an exhaust manifold section and a pipe section associated with the cylinder head or by any pipes through which hot media flow, e.g., in the region of interfaces with exhaust gas recirculation lines and/or of lines leading to the exhaust turbocharger, to mention further possible uses of the pipe connection arrangement according to the invention in connection with the preferred use of the latter in an exhaust line of a combustion engine.

BRIEF DESCRIPTION OF THE DRAWINGS

The invention is explained in greater detail below with reference to a drawing, in which.

DETAILED DESCRIPTION OF THE PREFERRED EMBODIMENTS

Figure 1:
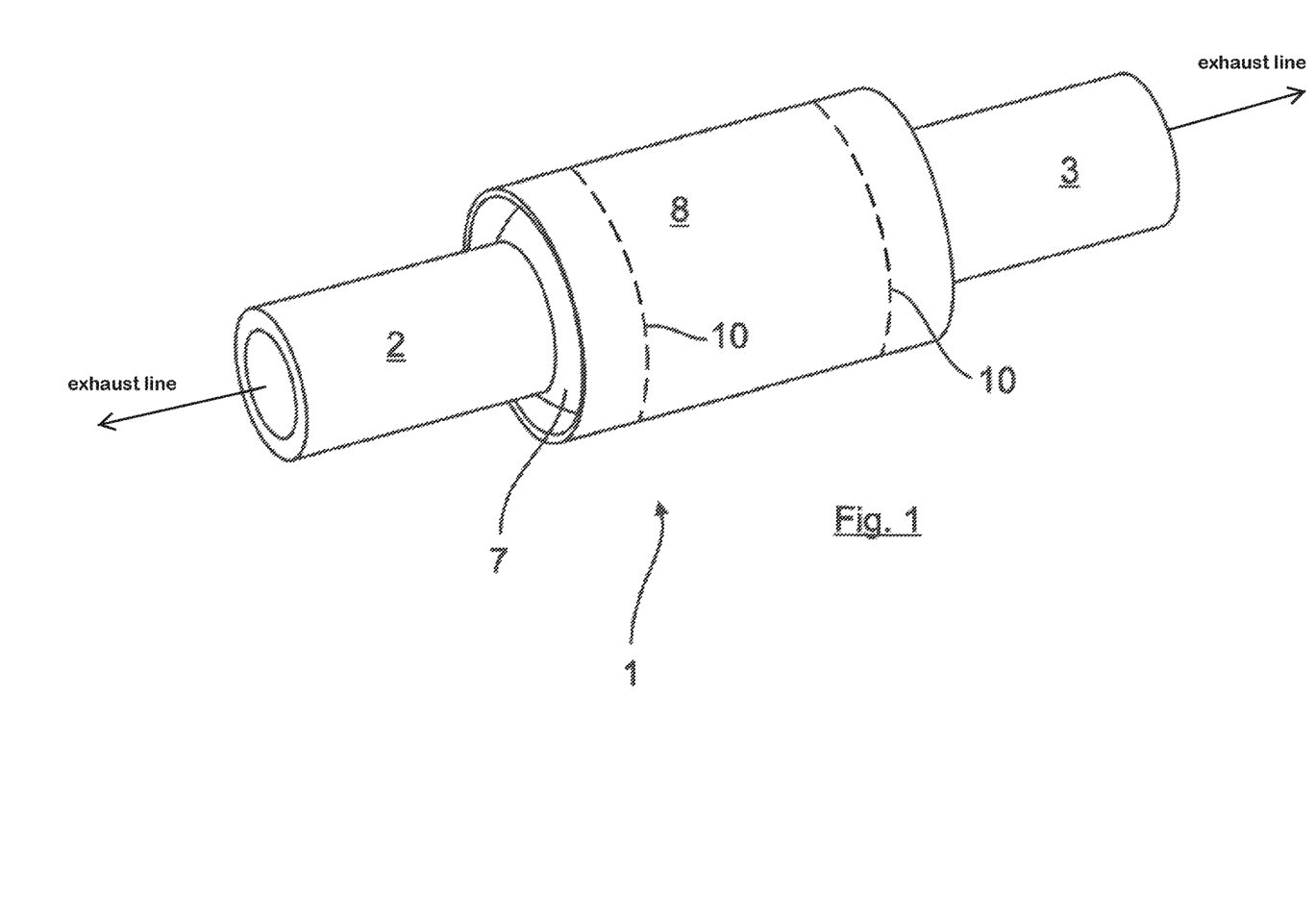
FIG. 1 is a schematic perspective external view of a pipe connection arrangement according to an embodiment of the invention.
Figure 7:
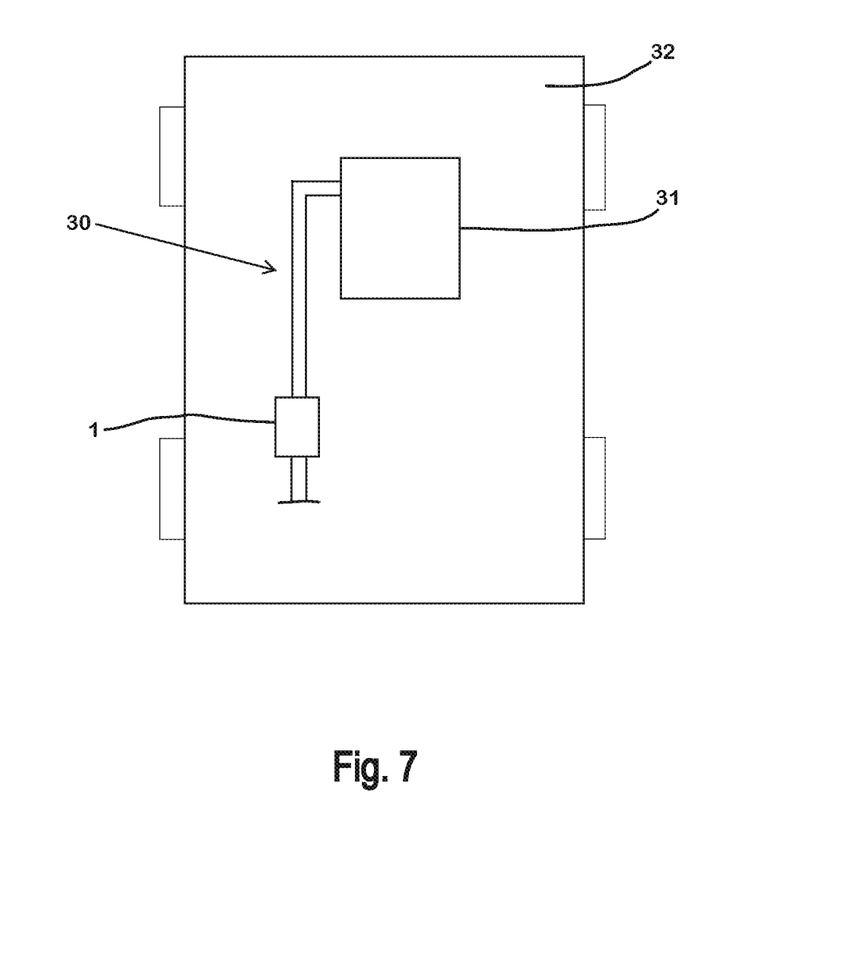
FIG. 7 shows a schematic diagram of an exhaust line of the combustion engine in a commercial vehicle with the pipe connection arrangement according FIG 1.

In FIG. 1, a perspective external view of a pipe connection arrangement 1 according to the invention is shown schematically and by way of example, said arrangement being used here, for example, to connect to pipe ends 2, 3. In one embodiment shown schematically in FIG. 7, the pipe connection arrangement 1 is adjacent manifold sections of an exhaust manifold in an exhaust line 30 of a combustion engine 31 in a commercial vehicle 32.

Figure 2:
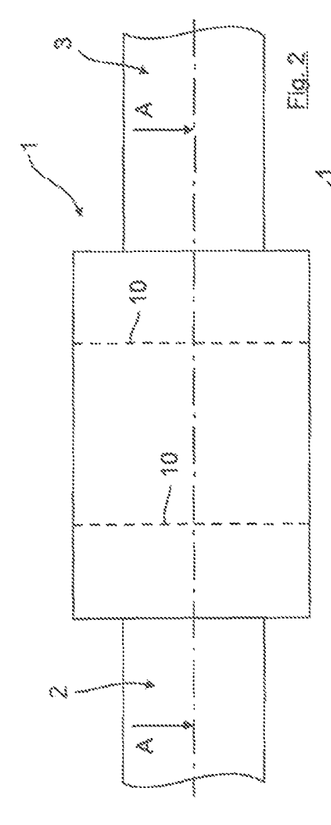
FIG. 2 shows the pipe connection arrangement according to FIG. 1 in a side view.
Figure 3:
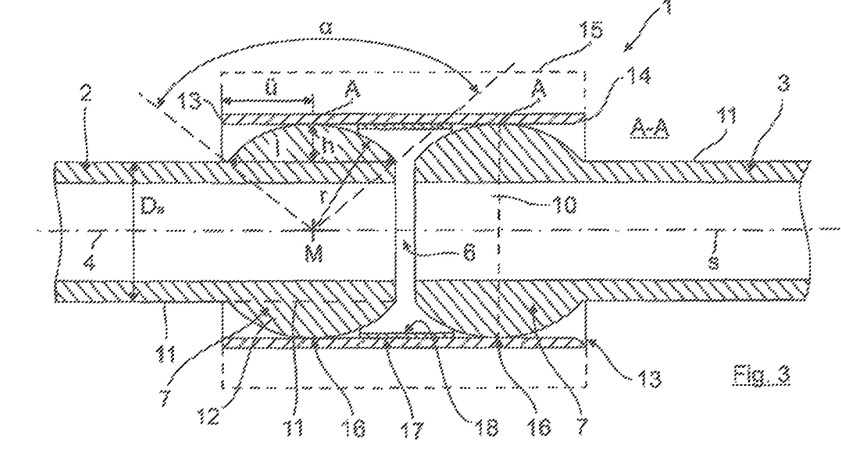
FIG. 3 shows a section through the pipe connection arrangement according to FIG. 2 along the line A-A in a starting position, in which the two pipe ends held in the connecting pipe are shown in a starting or initial position and are exactly in alignment.

As can be seen especially from FIG. 2, which shows a side view of FIG. 1, and FIG. 3, which shows a section along the line A-A in FIG. 2, when viewed together, the pipe connection arrangement 1 here has two pipe ends 2, 3, which are in alignment as regards their centre lines 4, 5, are aligned axially with one another and are spaced apart by means of an axial gap 6, each of said pipe ends having a raised spherical segment 7 running around in a ring shape on its outer circumferential surface.

The two pipe ends 2, 3, which are shown in their starting position in FIG. 3, without an axial and angular offset and thus in exact alignment with one another, are accommodated by means of their raised spherical segments 7 in a connecting pipe 8 surrounding the pipe ends 2, 3 on the outside in an overlapping section.

Here, by way of example, this connecting pipe 8 is designed as a cylindrical pipe with a constant inside and outside diameter throughout and thus has an inner wall 9 of smooth and circular-cylindrical design with an identical inside diameter throughout, on which the two raised spherical segments 7 of the pipe ends 2, 3 each rest along a circular line 10 in the inserted state shown in FIGS. 1 to 3, as illustrated in a purely schematic way and in dashed lines in FIG. 1 and only in an extremely schematic way in FIGS. 2 and 3 (in that case in a two-dimensional projection).

Figure 4:
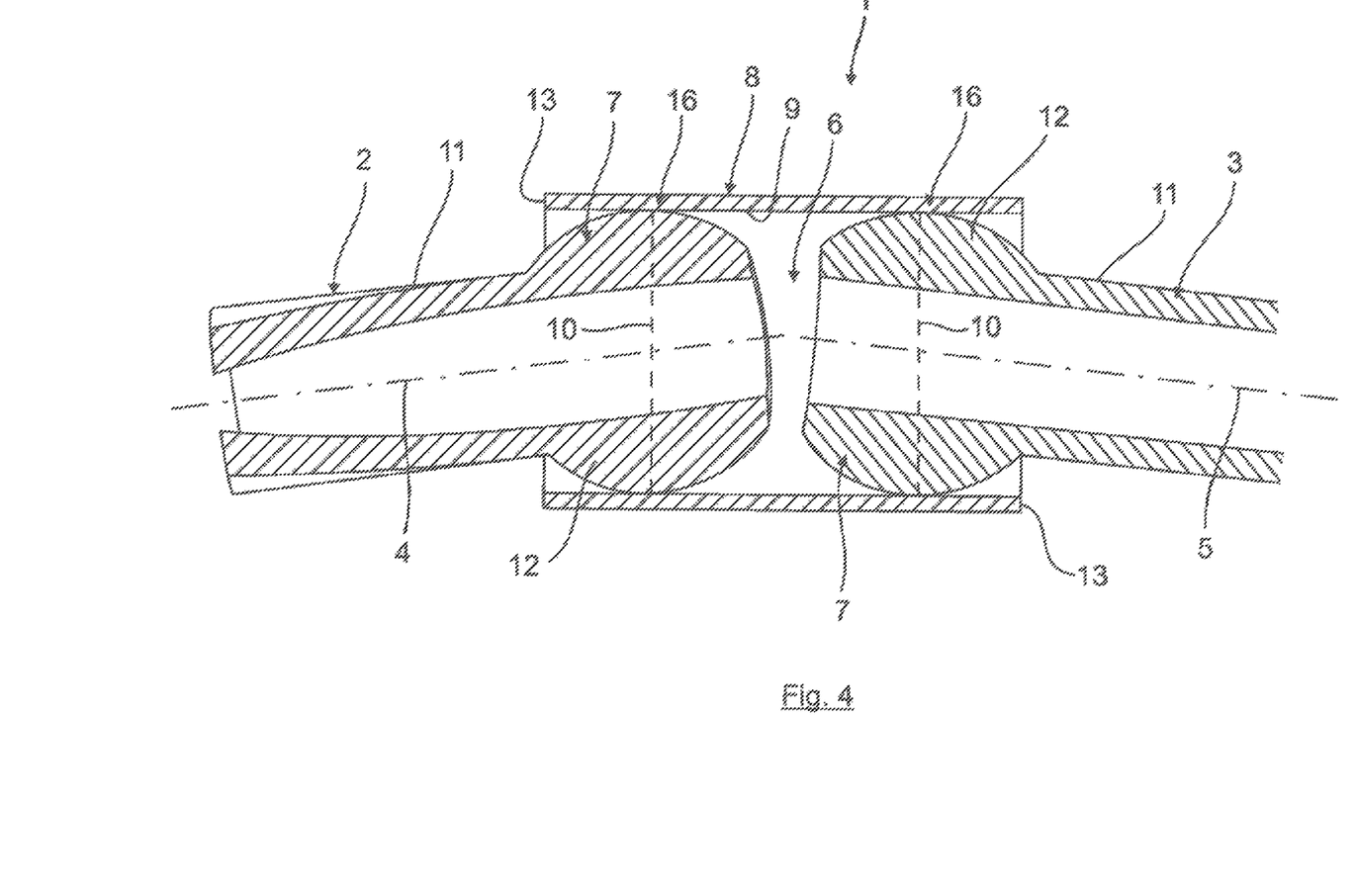
FIG. 4 shows an illustration corresponding to FIG. 3, in which the pipe ends are no longer exactly in alignment but have an axial offset or angular misalignment to be compensated, relative to the starting position in FIG. 3.

With this contact in the form of a circular line, a relatively large range in which axial and angular offsets of the two pipe ends can be accommodated over a wide range or to a large extent in a functionally reliable manner with a contact joint between the spherical segments 7 and the inner wall 9 of the connecting pipe 8 which is leaktight as before is made available, this being indicated schematically in FIG. 4. In concrete terms, the two raised spherical segments 7 are for this purpose preferably designed in such a way, when seen in longitudinal section (FIG. 3), that they form a circular segment 12 adjoining the smooth outside 11 of the pipe ends 2, 3, to which circular segment at least one, preferably all, of the following conditions applies/apply:

a) the centre angle α measured from the centre M of the circle of the circular segment 12 to the points at which the circular segment adjoins the outside 11 of the pipe end is 90° to 120°, preferably 100° to 110°, b) the ratio of the segment height h to the segment length 1 defined by the chord of the circle is 1:3 to 1:5, preferably 1:3.5 to 1:4.2, c) the ratio of the segment height h to the radius r is 1:2 to 1:3, preferably 1:2.4 to 1:2.7, d) the ratio of the radius r to the circular segment length 1 defined by the chord of the circle is 1:1.25 to 1:1.75, preferably 1:1.4 to 1:1.6, most preferably approximately 1:1.15.

e) the distance ü of the point of contact A (which is part of the circular line 10)—based on the longitudinal section through the pipe connection arrangement 1 shown in FIG. 3—of the raised spherical segment 7 from the insertion edge 13, associated with the spherical segment 7, of the inner wall 9 of the connecting pipe is at most 2.5 times the segment height h, preferably at most 2.0 times the segment height h, and at least 1.0 times the segment height h, preferably at least 1.5 times the segment height h, f) the ratio of the radius r of the circular segment to the outside diameter $D_a$ of the pipe ends 2, 3 in the region outside the raised spherical segment 7 is 1:1.1 to 1:1.4, preferably 1:1.2 to 1:1.3.

As can furthermore be seen from the schematic illustration in FIG. 3, although it is shown only at the right-hand end of the connecting pipe 8 in that case for reasons of clarity, a chamfer 14, in particular a chamfer 14 which is rounded, as shown, can be provided on at least one, preferably on both, of the two opposite ends of the connecting pipe 8, said chamfer facilitating the insertion of the spherical segments 7 of the ends of the pipes into the connecting pipe 8, especially when the outside diameter of the spherical segment 7 has an oversize relative to the correspondingly associated inside diameter of the inner wall 9 of the connecting pipe 8.

As is apparent in a purely schematic way from FIG. 3 and as depicted there only in dashed lines, the connecting pipe 8 can be provided with a thermally insulating coating 15 on the outside thereof, at least in some region or regions. This can be formed by a lagging or insulating material, for example.

According to another, particularly preferred embodiment, a coating 18 which effects exhaust gas purification and/or contributes to exhaust gas purification, in particular a catalytically active coating 18, can be provided, in particular in an inner wall segment 17 situated between the two spherical-segment contact regions 16. Purely for reasons of clarity, this is shown raised by an exaggerated amount here.

Both the inner wall 9 and the surface of the spherical segments 7 can furthermore be provided with a wear-resistant coating or be formed with such a wear-resistant coating there, e.g., by precipitation hardening of an alloy.

As shown in the illustrative embodiment in FIGS. 1 to 4, the two raised spherical segments 7 at the pipe ends 2, 3 can be of identical design with geometrically substantially the same dimensions and thus form identical parts. For this purpose, the respective raised spherical segment 7 can, for example, be of materially uniform and/or integral design with the associated pipe end, it being possible to achieve this by machining or by forming, for example.

Figure 5:
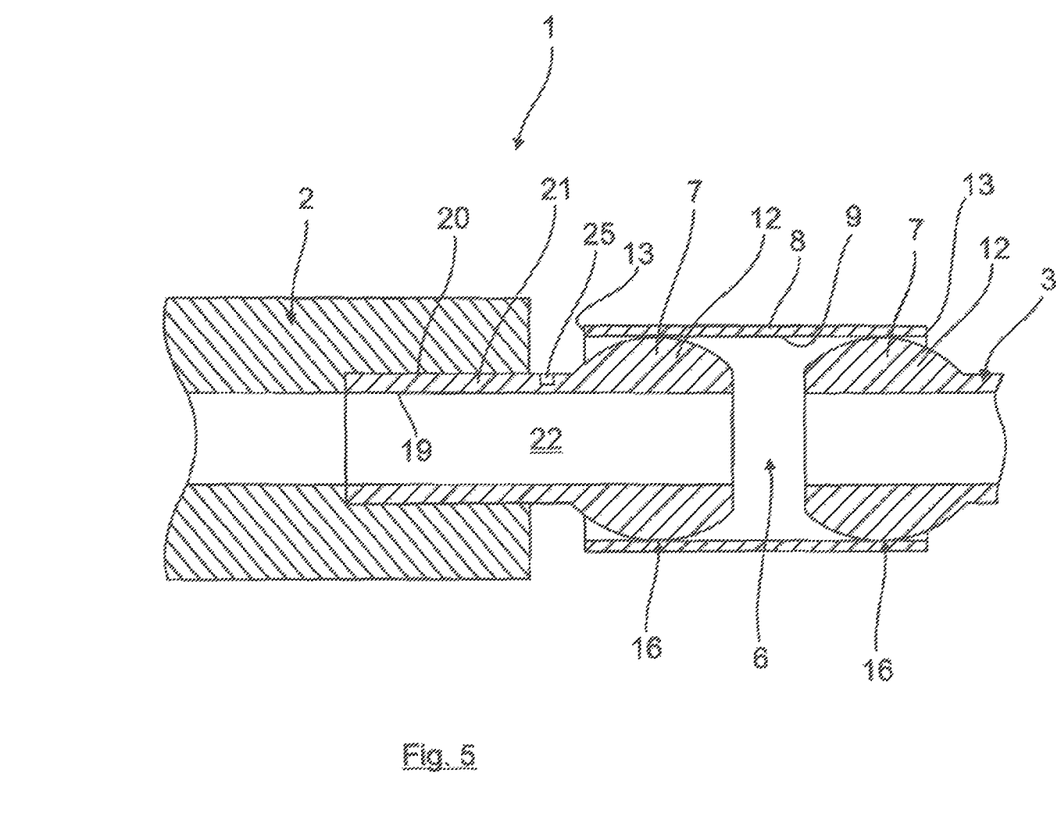
FIG. 5 shows schematically an alternative embodiment having a spherical segment that has a spigot portion, wherein the spigot portion has an external thread by means of which it is screwed into an internal thread on the associated pipe end.
Figure 6:
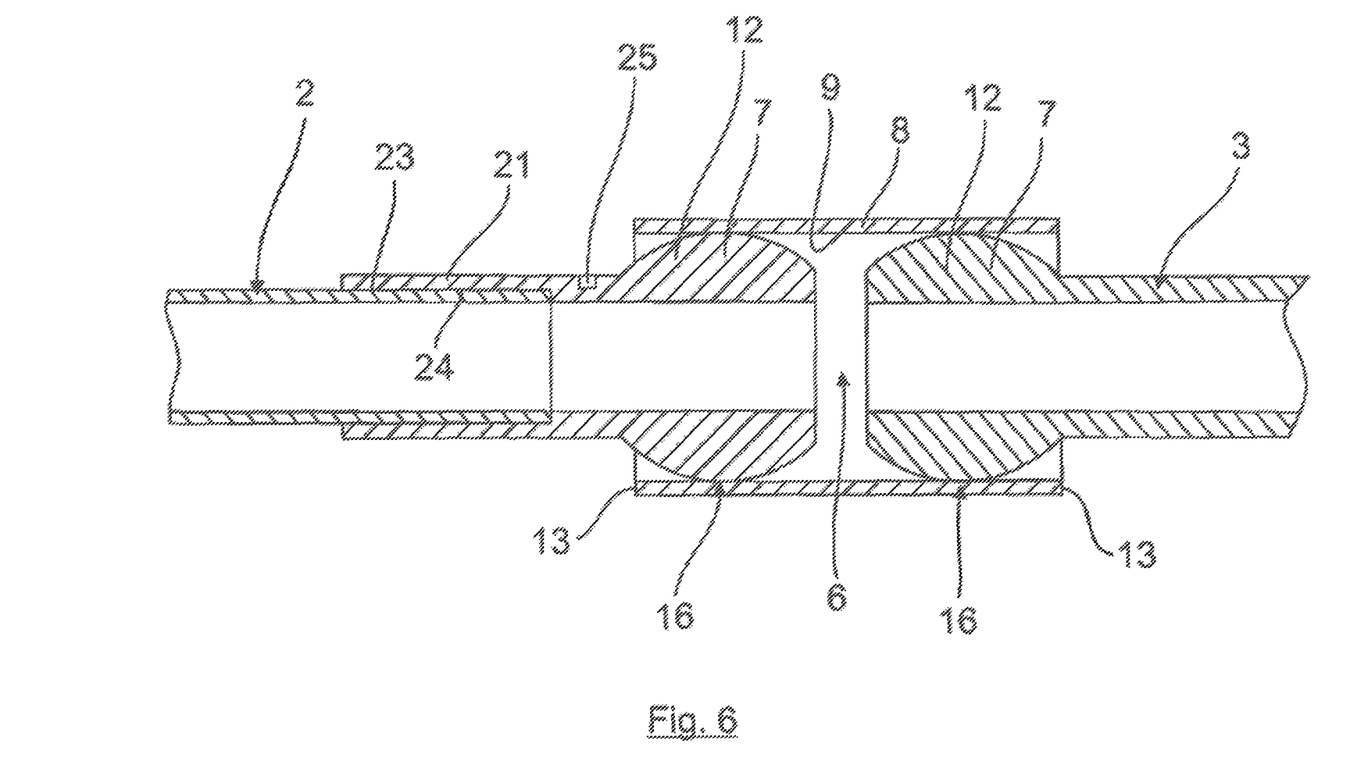
FIG. 6 shows an embodiment forming an alternative to FIG. 5, in which the spigot portion of the spherical segment has an internal thread which is screwed to a corresponding external thread on the associated pipe end.

As an alternative, as shown by way of example in FIGS. 5 and 6, in each case in connection with the spherical segment 7 on the left there, it is also possible for at least one of the raised spherical segments 7 to be formed by a separate component, which can then be connected positively and/or non-positively to its associated pipe end 2.

As shown by way of example in FIG. 5, the pipe end 2 can, for example, have an internal thread 19, into which the raised spherical segment 7 can be screwed by means of a spigot portion 21, which adjoins the spherical segment 7 and has a corresponding external thread 20. It is self-evident that both the spigot portion 21 and the spherical segment 7 here each have or form an internal recess 22, which forms the extension of the hollow pipe end 2.

As an alternative to this embodiment in FIG. 5, provision can also be made, in an analogous embodiment, for the spigot portion 21 to be pressed into the pipe end.

FIG. 6 shows an alternative embodiment to FIG. 5, in which the pipe end has an external thread 23, onto which the raised spherical segment 7 is screwed by means of a spigot portion 21, which adjoins the spherical segment 7 and has a corresponding internal thread 24.

A tool application feature 25 for screwing the spherical segment to the associated pipe end, e.g., in the form of at least one slot-type engagement recess, can then be provided on the spherical segment 7, in this case more specifically on the spigot portion 21 forming part of the spherical segment 7. In this case, the tool application feature 25 can additionally or alternatively also be formed directly on the spherical segment 7 itself, i.e., is not formed on the spigot portion 21 of the spherical segment 7.

As an alternative to this embodiment in FIG. 6, provision can also be made, in an analogous embodiment, for the hollow spherical segment 7 to be pressed onto the pipe end.

Moreover, the spherical segment 7 produced by a separate component can alternatively or additionally also be connected to the associated pipe end 2 by a material joint, e.g., by welding and/or brazing.

LIST OF REFERENCE SIGNS 1 pipe connection arrangement
2 pipe end
3 pipe end
4 centre line
5 centre line
6 axial gap
7 spherical segment
8 connecting pipe
9 inner wall
10 circular line
11 smooth outside
12 circular segment
13 insertion edge
14 chamfer
15 thermally insulating coating
16 spherical-segment contact regions
17 inner wall segment
18 catalytically active coating
19 internal thread
20 external thread 21 spigot portion
22 internal recess
23 external thread
24 internal thread
25 tool application feature
30 exhaust line
31 combustion engine
32 commercial vehicle

The invention claimed is:

1. A pipe connection arrangement for connecting two pipe ends, comprising:
    two pipe ends at least one of aligned axially and spaced apart, each of the pipe ends having an outer circumferential surface;
    raised spherical segments on respective outer circumferential surfaces of the two pipe ends, the spherical segments being ring-shaped;
    a connecting pipe surrounding the pipe ends in an overlapping section, the spherical segments of the two pipe ends being accommodated in the connecting pipe such that a circumference of each of the spherical segments rest radially on an inner wall of the connecting pipe along a circular-line in circular-line contact in a spherical-segment contact region; and
    at least one of a catalytic substrate and a catalytic coating in a region in the interior of the connecting pipe, wherein the at least catalytic substrate and a catalytic coating effects purification of an exhaust gas of a combustion engine or contributes to the purification of the exhaust gas, and
    wherein at least one of:
        the inner wall of the connecting pipe is smooth and has a circular-cylindrical shape with a constant inside diameter throughout an entire length of the connecting pipe;
        the connecting pipe is a cylindrical pipe with a constant inside diameter and a constant outside diameter throughout an entire length of the connecting pipe; and
        at least one of the raised spherical segments is formed as a separate component connected to a corresponding one of the pipe ends.

2. The pipe connection arrangement of claim 1, wherein the two pipe ends are arranged in an exhaust line of a combustion engine.

3. The pipe connection arrangement of claim 1, wherein the inner wall of the connecting pipe is smooth and has a circular-cylindrical shape in the spherical-segment contact region, an inside diameter of the inner wall corresponds to the spherical-segment contact region in contact with the circle segments.

4. The pipe connection arrangement of claim 1, wherein the inner wall of the connecting pipe is smooth and has the circular-cylindrical shape with the constant inside diameter throughout the entire length of the connecting pipe.

5. The pipe connection arrangement of claim 1, wherein the connecting pipe has two opposing ends and that a chamfer is arranged at each of the two opposing ends.

6. The pipe connection arrangement of claim 1, wherein the connecting pipe is the cylindrical pipe with the constant inside diameter and the constant outside diameter throughout the entire length of the connecting pipe.

7. The pipe connection arrangement of claim 1, wherein the at least one of a catalytic substrate and a catalytic coating is arranged between the spherical-segment contact regions.

8. The pipe connection arrangement of claim 1, further comprising a thermally insulating coating disposed on an outside of the connecting pipe.

9. The pipe connection arrangement of claim 1, wherein at least one of the raised spherical segments forms a circular segment having ends adjoining a smooth outside of a compounding one of the pipe ends and at least one of the following conditions applies:
    a center angle measured from a center of a circle of the circular segment to the ends adjoining the smooth outside of the one of the pipe ends is 90° to 120°;
    a ratio of a segment height of the circular segment to a segment length of the circular segment defined by a chord of the circle is 1:3 to 1:5;
    a ratio of the segment height to a radius of the circle of the circular segment is 1.2 to 1:3; and
    a ratio of the radius to the segment length of the circular segment is 1:1.25 to 1:1,75.

10. The pipe connection arrangement of claim 9, wherein the ratio of the radius to the segment length of the circular segment is 1:1.5.

11. The pipe connection arrangement of claim 9, wherein for each of the raised spherical segments a distance of a point of contact of the raised spherical segment on the inner wall of the connecting pipe from an insertion edge of the connecting pipe is not greater than 2.5 times the segment height and at least 1.0 times the segment height.

12. The pipe connection arrangement of claim 9, wherein for each of the raised spherical segments a distance of a point of contact of the raised spherical segment on the inner wall of the connecting pipe from an insertion edge of the connecting pipe is not greater than 2.0 times the segment height and at least 1.5 times the segment height.

13. The pipe connection arrangement of claim 9, wherein a ratio of the radius of the circular segment to an outside diameter of the corresponding one of the pipe ends in a region outside the raised spherical segment is 1:1.1 to 1:1.4.

14. The pipe connection arrangement of claim 9, wherein a ratio of the radius of the circular segment to an outside diameter of the corresponding one of the pipe ends in a region outside the raised spherical segment is 1:1.2 to 1:1.3.

15. The pipe connection arrangement of claim 1, wherein at least one of the raised spherical segments forms a circular segment having ends adjoining a smooth outside of a corresponding one of the pipe ends and at least one of the following conditions applies:
    a center angle measured from a center of a circle of the circular segment to the ends adjoining the smooth outside of the one of the pipe ends is 100° to 110° ;
    a ratio of a segment height of the circular segment to a segment length of the circular segment defined by a chord of the circle is 1:3.5 to 1:4.2;
    a ratio of the segment height to a radius of the circle of the circular segment is 1;2.4 to 1:2.7; and
    a ratio of the radius to the segment length of the circular segment is 1:1.4 to 1:1.6.

16. The pipe connection arrangement of claim 1, wherein the raised spherical segments are of identical design and have geometrically the same dimensions.

17. The pipe connection arrangement of claim 1, wherein at least one of the raised spherical segments is formed as only a single piece of material with a corresponding one of the pipe ends.

18. The pipe connection arrangement of claim 1, wherein the at least one of the raised spherical segments is formed as the separate component connected to the corresponding one of the pipe ends.

19. The pipe connection arrangement of claim 18, wherein the corresponding one of the pipe ends has one of an internal thread and an external thread and the at least one of the raised spherical segments has a spigot portion with one of an external thread and an internal thread, respectively.

20. The pipe connection arrangement of claim 19, wherein the at least one of the raised spherical segments includes a tool application feature.

21. The pipe connection arrangement of claim 18, wherein the at least one spherical segment has an internal recess and is pressed onto the corresponding one of the pipe ends or the at least one spherical segment has a spigot portion that is pressed into the corresponding one of the pipe ends.

22. The pipe connection arrangement of claim 18, wherein the at least one spherical segment is connected materially to the corresponding one of the pipe ends by one of welding and the brazing.

23. An exhaust line of a combustion engine of a vehicle having two exhaust pipes connected by a pipe connection arrangement according to claim 1.

24. A commercial vehicle having a combustion engine with an exhaust according to claim 23.

* * * * *